(12) United States Patent
Takahashi et al.

(10) Patent No.: US 10,174,685 B2
(45) Date of Patent: Jan. 8, 2019

(54) CONTROL DEVICE AND CONTROL METHOD FOR INTERNAL COMBUSTION ENGINE

(71) Applicant: Mitsubishi Electric Corporation, Chiyoda-ku, Tokyo (JP)

(72) Inventors: Shingo Takahashi, Chiyoda-ku (JP); Shuichi Wada, Kobe (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 1195 days.

(21) Appl. No.: 14/051,677

(22) Filed: Oct. 11, 2013

(65) Prior Publication Data
US 2014/0316680 A1    Oct. 23, 2014

(30) Foreign Application Priority Data

Apr. 19, 2013 (JP) ................................ 2013-088535

(51) Int. Cl.
*F02D 41/00* (2006.01)
*F02D 41/22* (2006.01)

(52) U.S. Cl.
CPC ...... *F02D 41/0002* (2013.01); *F02D 41/0087* (2013.01); *F02D 41/22* (2013.01);
(Continued)

(58) Field of Classification Search
CPC ............. F02D 41/1454; F02D 41/1441; F02D 41/0085; F02D 41/0002; F02D 41/008;
(Continued)

(56) References Cited

U.S. PATENT DOCUMENTS

| 5,587,909 A * | 12/1996 | Matsumoto ............ G01M 15/11 |
| | | 701/111 |
| 2005/0109302 A1* | 5/2005 | Tetsuno ................ F02D 41/042 |
| | | 123/179.5 |

(Continued)

FOREIGN PATENT DOCUMENTS

| JP | 09-217643 A | 8/1997 |
| JP | 2005-178636 A | 7/2005 |

(Continued)

OTHER PUBLICATIONS

Japanese Office Action (Preliminary Notice of Reasons for Rejection), dated Jan. 7, 2014, Patent Application No. 2013-088535.

*Primary Examiner* — Thomas Moulis
*Assistant Examiner* — John Bailey
(74) *Attorney, Agent, or Firm* — Sughrue Mion, PLLC; Richard C. Turner (57) ABSTRACT

The control device for an internal combustion engine including a plurality of cylinders includes: a misfire detection unit for detecting a misfire state for each of the plurality of cylinders; a plurality of electronic throttles each provided on an intake pipe corresponding to each of the plurality of cylinders, for adjusting an intake air amount taken into each cylinder by way of a throttle opening degree; and a throttle opening degree control unit for controlling the throttle opening degree of each of the plurality of electronic throttles. When the misfire detection unit detects the misfire state in any one of the plurality of cylinders, the throttle opening degree control unit decreases a limited value of the throttle opening degree of the cylinder in the misfire state as time elapses.

8 Claims, 5 Drawing Sheets

(52) U.S. Cl.
CPC ............... *F02D 2041/227* (2013.01); *F02D 2200/1015* (2013.01); *Y02T 10/42* (2013.01)

(58) Field of Classification Search
CPC ........ F02D 41/009; F02D 41/30; F02D 45/00; Y02T 10/42; Y02T 10/44
USPC ......... 123/406.11, 406.14, 406.27, 288, 298, 123/301, 304, 325, 326, 332, 338, 339.12, 123/344, 359, 387, 394, 402, 403, 406.15, 123/406.23, 406.3, 406.32, 406.33, 123/406.45, 406.47, 406.48, 406.52, 704, 123/445, 457, 495, 497, 505, 510, 516, 123/518, 179.16, 179.18, 198 DB, 336, 123/337, 376, 683, 442; 701/29.1, 104, 701/86, 103, 85; 60/790
See application file for complete search history.

(56) References Cited

U.S. PATENT DOCUMENTS

2006/0005808 A1* 1/2006 Blomenberg ......... F02D 9/1065
123/399
2006/0005811 A1* 1/2006 Hartmann ............. F02D 17/02
123/406.47
2006/0112932 A1* 6/2006 Toyoda .................. G01M 15/11
123/406.27
2008/0243359 A1* 10/2008 Shinogi ................ F02D 11/105
701/102
2009/0007884 A1* 1/2009 Bunne .................... B62K 23/04
123/399
2009/0240423 A1* 9/2009 Fujino .................... F02D 37/02
701/111
2010/0036591 A1* 2/2010 Nakai .................... F02D 41/042
701/112
2012/0303249 A1* 11/2012 Minami .............. F02D 41/0072
701/112

FOREIGN PATENT DOCUMENTS

| JP | 2008-190433 A | 8/2008 |
| JP | 4424178 B2 | 3/2010 |
| JP | 2011-149342 A | 8/2011 |
| JP | 2012-026365 A | 2/2012 |

\* cited by examiner

CONTROL DEVICE AND CONTROL METHOD FOR INTERNAL COMBUSTION ENGINE

BACKGROUND OF THE INVENTION

1. Field of the Invention

The present invention relates to a control device and a control method for an internal combustion engine (engine) including a plurality of cylinders, which are capable of detecting a misfire state in each of the plurality of cylinders.

2. Description of the Related Art

In recent years, it is required even for motorcycles to detect a misfire state in order to prevent exhaust gas from degrading as counter measures against environmental problems or in order to protect a catalyst provided on an exhaust system of an internal combustion engine.

On this occasion, regarding the detection of the misfire state, there has been proposed a misfire detection device for multi-cylinder engine that is configured to, in a case where such a high misfire rate that damages the catalyst is detected, cut a fuel or change a throttle opening degree to a limited opening degree used when a misfire state is detected in order to limit the speed of a vehicle (see, for example, Japanese Patent No. 4424178).

However, the conventional technology has the following problems.

In the case where the conventional misfire detection device is applied to a lightweight vehicle such as a motorcycle, if the fuel cut is immediately carried out or if the throttle opening degree is immediately changed to a limited opening degree used when a misfire is detected, an abrupt attenuation in torque may occur to generate a shock on the vehicle, resulting in degradation in drivability.

Moreover, upon recovery from the fuel cut or the throttle limited opening degree, an abrupt increase in torque may occur to degrade the drivability. Further, if a detection error occurs in the detection of the misfire state due to interference or the like, a sudden fuel cut is carried out or the throttle opening degree is changed to the throttle limited opening degree during a normal travel, with the result that an abrupt change in torque may occur to degrade the drivability.

SUMMARY OF THE INVENTION

The present invention has been made in view of the above-mentioned problems, and therefore has an object to provide a control device and a control method for an internal combustion engine, which are capable of appropriately protecting a catalyst and preventing the drivability from degrading when the misfire state is detected.

According to one embodiment of the present invention, there is provided a control device for an internal combustion engine including a plurality of cylinders, the control device including: a misfire detection unit for detecting a misfire state for each of the plurality of cylinders; a plurality of electronic throttles each provided on an intake pipe corresponding to each of the plurality of cylinders, for adjusting an intake air amount taken into each of the plurality of cylinders by way of a throttle opening degree; and a throttle opening degree control unit for controlling the throttle opening degree of each of the plurality of electronic throttles, in which, when the misfire detection unit detects the misfire state in any one of the plurality of cylinders, the throttle opening degree control unit decreases a limited value of the throttle opening degree of the cylinder in the misfire state as time elapses.

Further, according to another embodiment of the present invention, there is provided a control method for an internal combustion engine, the internal combustion engine including: a plurality of cylinders; a misfire detection unit for detecting a misfire state for each of the plurality of cylinders; and a plurality of electronic throttles each provided on an intake pipe corresponding to each of the plurality of cylinders, for adjusting an intake air amount taken into each of the plurality of cylinders by way of a throttle opening degree, the control method including decreasing, when the misfire detection unit detects the misfire state in any one of the plurality of cylinders, a limited value of the throttle opening degree of the cylinder in the misfire state as time elapses.

According to the control device and the control method for an internal combustion engine of one embodiment of the present invention, when the misfire detection unit detects the misfire state in any one of the plurality of cylinders, the throttle opening degree control unit (step) decreases the limited value of the throttle opening degree of the cylinder in the misfire state as the time elapses.

As described above, by gradually decreasing the limited value of the throttle opening degree in the cylinder in which the misfire state is detected, the abrupt change in torque can be suppressed and the shock on the vehicle can be mitigated.

Therefore, the catalyst can be appropriately protected and the drivability can be prevented from degrading when the misfire state is detected.

DETAILED DESCRIPTION OF THE PREFERRED EMBODIMENT

A description is now given of a control device and a control method for an internal combustion engine according to an exemplary embodiment of the present invention referring to the drawings, and like or corresponding components are denoted by like numerals throughout the drawings. Note that, in the following embodiment, an internal combustion engine for motorcycle is exemplified.

First Embodiment

Figure 1:
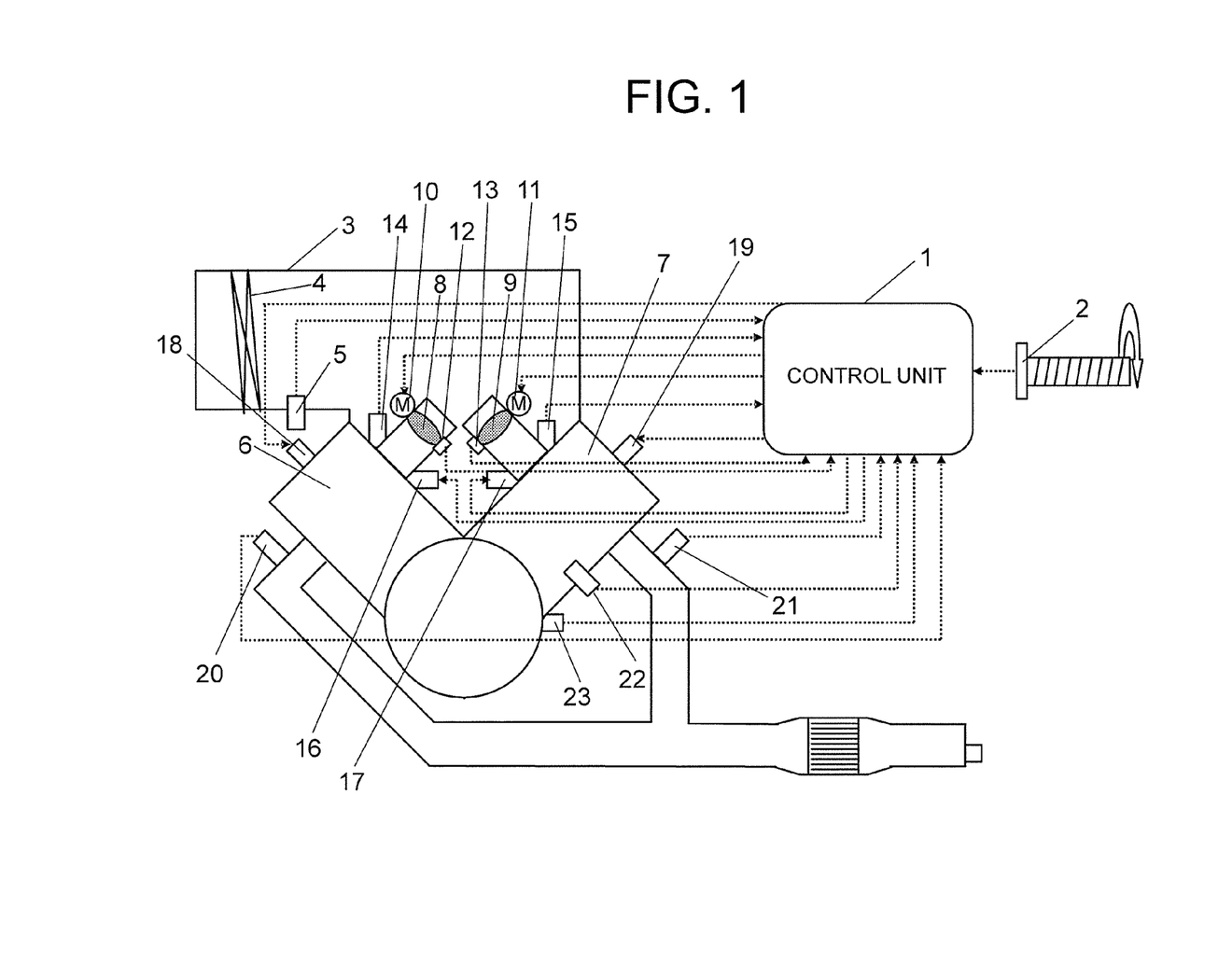
FIG. 1 is a configuration diagram illustrating an overall system including a control device for an internal combustion engine according to a first embodiment of the present invention.

FIG. 1 is a configuration diagram illustrating an overall system including a control device for an internal combustion engine according to a first embodiment of the present invention. FIG. 1 illustrates a system configuration of a V-twin engine as the internal combustion engine (hereinafter also referred to as "engine") according to the first embodiment of the present invention.

In FIG. 1, the system includes a control unit 1 (a fuel injection control unit, an ignition control unit, a misfire detection unit, and a throttle opening degree control unit) constructed by a microprocessor (not shown) including a memory for storing programs and maps for controlling the entire engine and a CPU.

To the control unit 1, an accelerator position sensor 2 for measuring a position of the accelerator opening degree is connected. An air filter 4 for purifying intake air taken into the engine, and an intake air temperature sensor 5 for measuring the temperature of the intake air are installed in an air cleaner box 3 provided on an intake side of the engine.

On the downstream side of the air cleaner box 3, a cylinder-a 6 and a cylinder-b 7 are provided. For the cylinder-a 6 and the cylinder-b 7, an electronic throttle for cylinder-a 8 and an electronic throttle for cylinder-b 9 which are independently controllable and used for adjusting an intake air amount by way of the throttle opening degree are provided on respective intake pipes.

On the electronic throttle for cylinder-a 8 and the electronic throttle for cylinder-b 9, an electronic throttle control motor for cylinder-a 10 and an electronic throttle control motor for cylinder-b 11 for controlling the respective throttle opening degrees, and a throttle position sensor for cylinder-a 12 and a throttle position sensor for cylinder-b 13 for measuring the respective throttle opening degrees are provided.

Moreover, on the downstream sides of the electronic throttle for cylinder-a 8 and the electronic throttle for cylinder-b 9, an intake air pressure sensor for cylinder-a 14 and an intake air pressure sensor for cylinder-b 15 for respectively measuring intake air pressures downstream of the electronic throttles, and an injector for cylinder-a 16 and an injector for cylinder-b 17 for injecting a fuel into the respective cylinders or the respective intake pipes are provided.

On the cylinder-a 6 and the cylinder-b 7, an ignition plug for cylinder-a 18 and an ignition plug for cylinder-b 19 for generating sparks to combust a mixture of the intake air and the fuel introduced into the cylinders are provided. Moreover, for the cylinder-a 6 and the cylinder-b 7, an $O_2$ sensor for cylinder-a 20 and an $O_2$ sensor for cylinder-b 21 for measuring an $O_2$ concentration in an exhaust gas are provided on respective exhaust pipes.

Moreover, in the cylinder-b 7, a water temperature sensor 22 for measuring a wall surface temperature of the engine to thereby measure a coolant temperature of the engine is provided. Moreover, on a crankshaft (not shown) of the engine that rotates in conjunction with the movement of pistons pushed out by the combustion of the mixture in the cylinders, a crank angle sensor 23 for measuring a position of the crankshaft is provided.

On this occasion, measurement signals from the respective sensors are input to the control unit 1, and the control unit 1 functions as the fuel injection control unit, the ignition control unit, the misfire detection unit, and the throttle opening degree control unit.

The fuel injection control unit calculates appropriate fuel injection timings and fuel injection amounts based on the measurement signals from the respective sensors, and outputs drive signals respectively to the injector for cylinder-a 16 and the injector for cylinder-b 17 which are fuel injection devices. Moreover, the ignition control unit calculates appropriate ignition timings based on the measurement signals from the respective sensors, and outputs ignition signals to ignition coils so as to generate sparks on the ignition plug for cylinder-a 18 and the ignition plug for cylinder-b 19.

Moreover, the misfire detection unit detects a misfire state for each of the cylinder-a 6 and the cylinder-b 7 by means of the method described in Japanese Patent No. 4424178, for example. The throttle opening degree control unit can control the throttle opening degree for each of the electronic throttle for cylinder-a 8 and the electronic throttle for cylinder-b 9, and, when the misfire detection unit detects the misfire state for any one of the cylinder-a 6 and the cylinder-b 7, gradually decreases a limited value of the throttle opening degree of the misfire cylinder as the time elapses.

On this occasion, after the limited value of the throttle opening degree is decreased to a predetermined value for the cylinder in which the misfire state is detected, the fuel injection control unit carries out fuel cut for the cylinder. Moreover, the throttle opening degree control unit and the fuel injection control unit continue to decrease the limited value of the throttle opening degree and carry out the fuel cut until the engine stops.

Further, when the misfire detection unit no longer detects the misfire state in a period from the start of the decrease of the limited value of the throttle opening degree for the cylinder in which the misfire state is detected until the fuel cut is carried out by the fuel injection control unit, the throttle opening degree control unit gradually increases the limited value of the throttle opening degree as the time elapses, thereby returning the limited value to that for the normal control.

Figure 2:
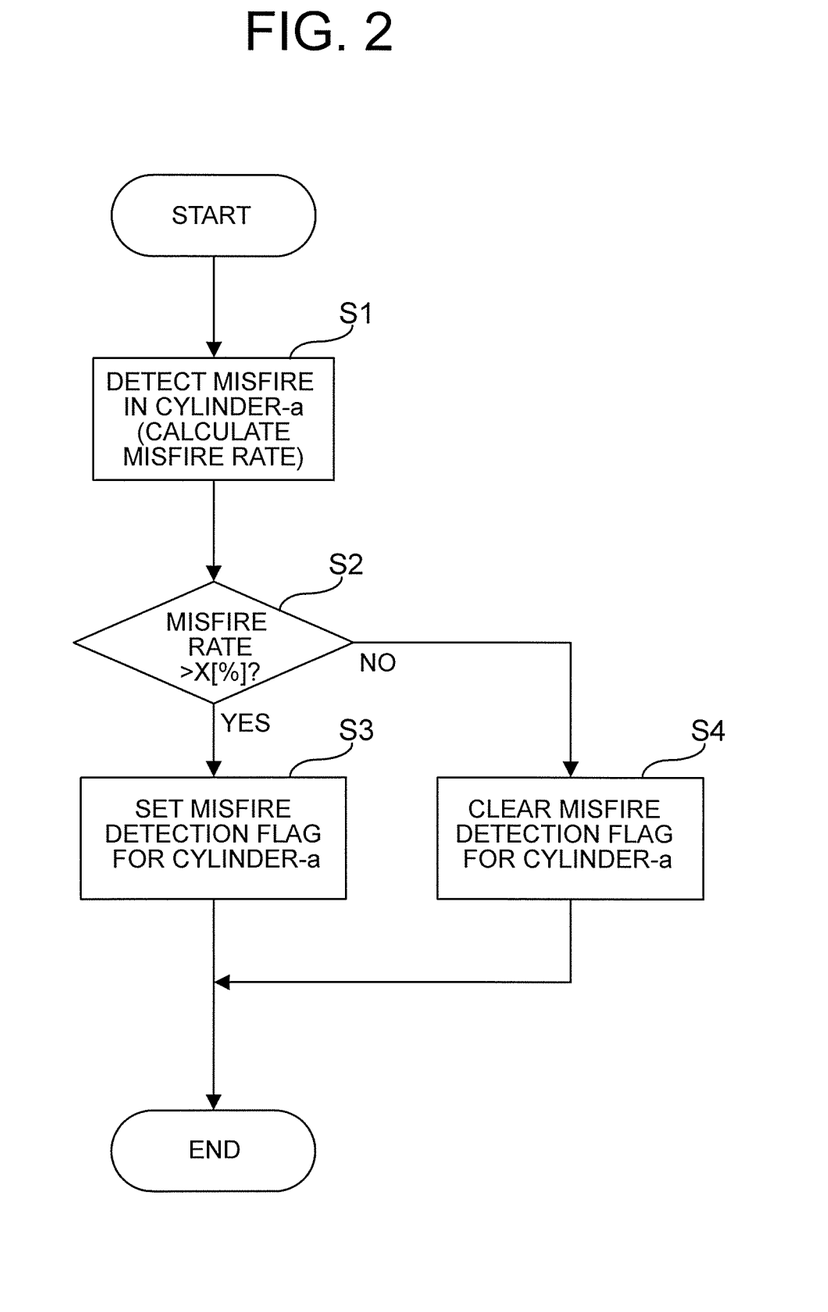
FIG. 2 is a flowchart illustrating processing of detecting a misfire rate in the control device for an internal combustion engine according to the first embodiment of the present invention.
Figure 3:
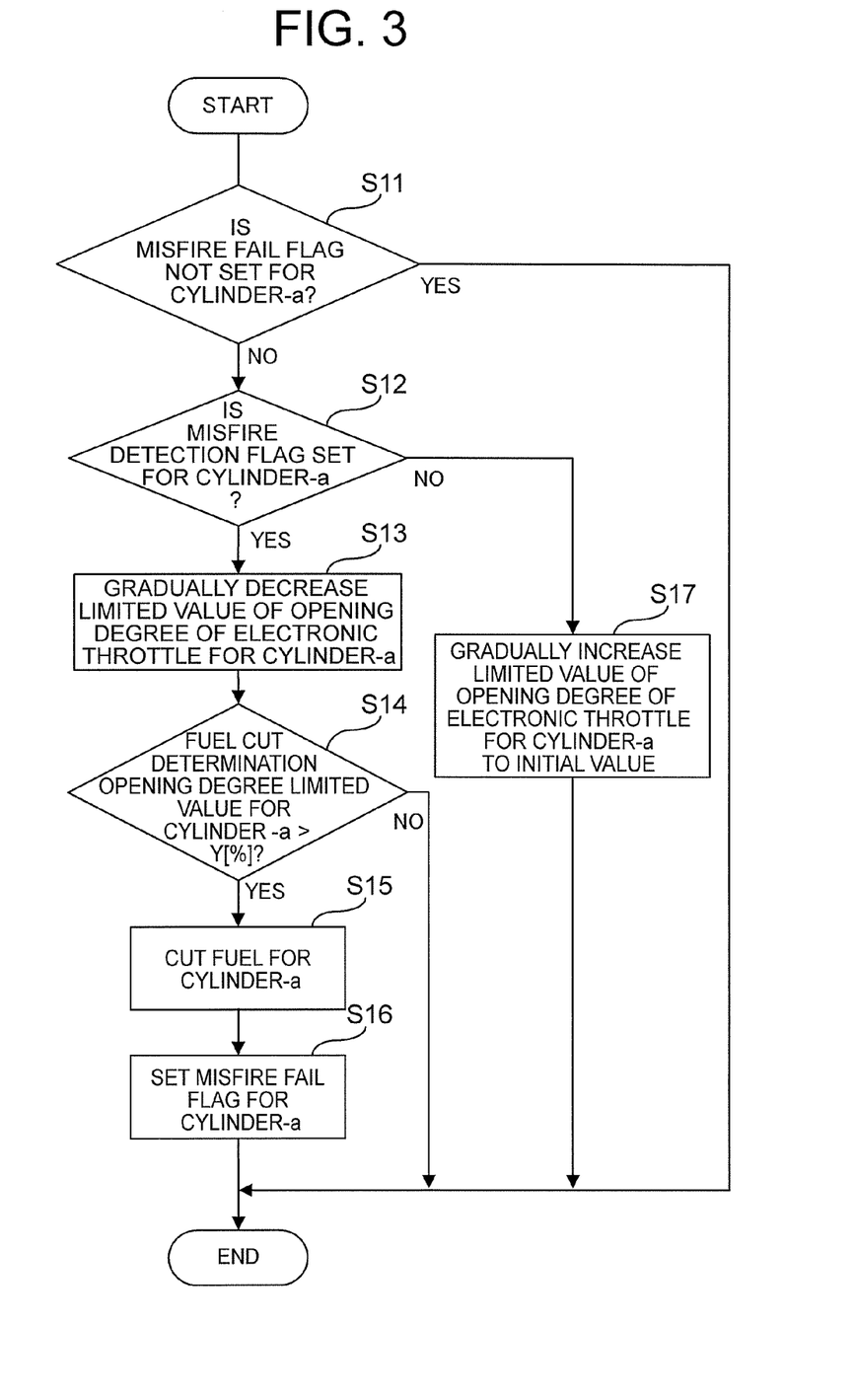
FIG. 3 is a flowchart illustrating processing for a limitation on a throttle opening degree of an electronic throttle and a fuel cut in the control device for an internal combustion engine according to the first embodiment of the present invention.
Figure 4:
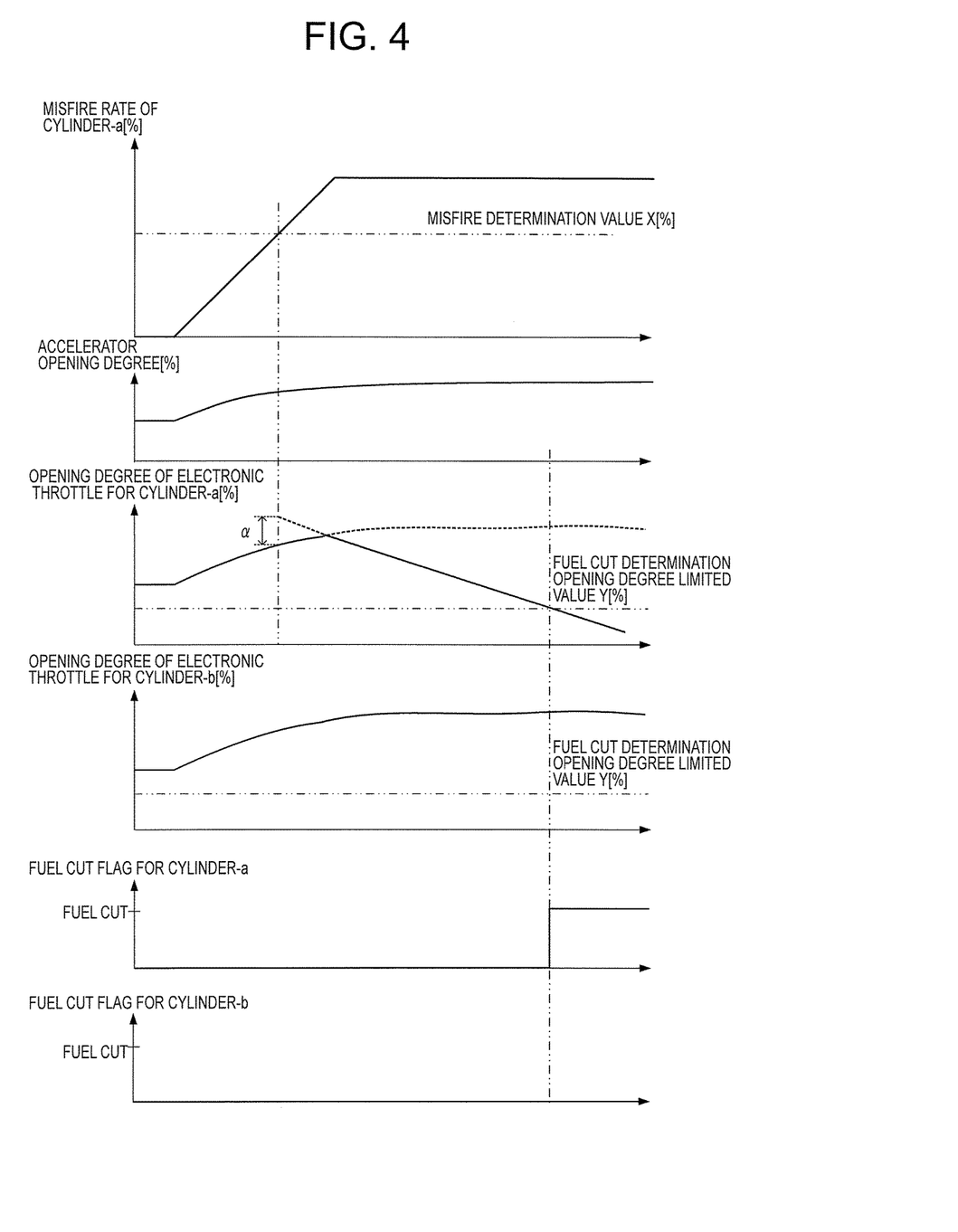
FIG. 4 is a timing chart showing the limitation on the throttle opening degree of the electronic throttle and the fuel cut in the control device for an internal combustion engine according to the first embodiment of the present invention.
Figure 5:
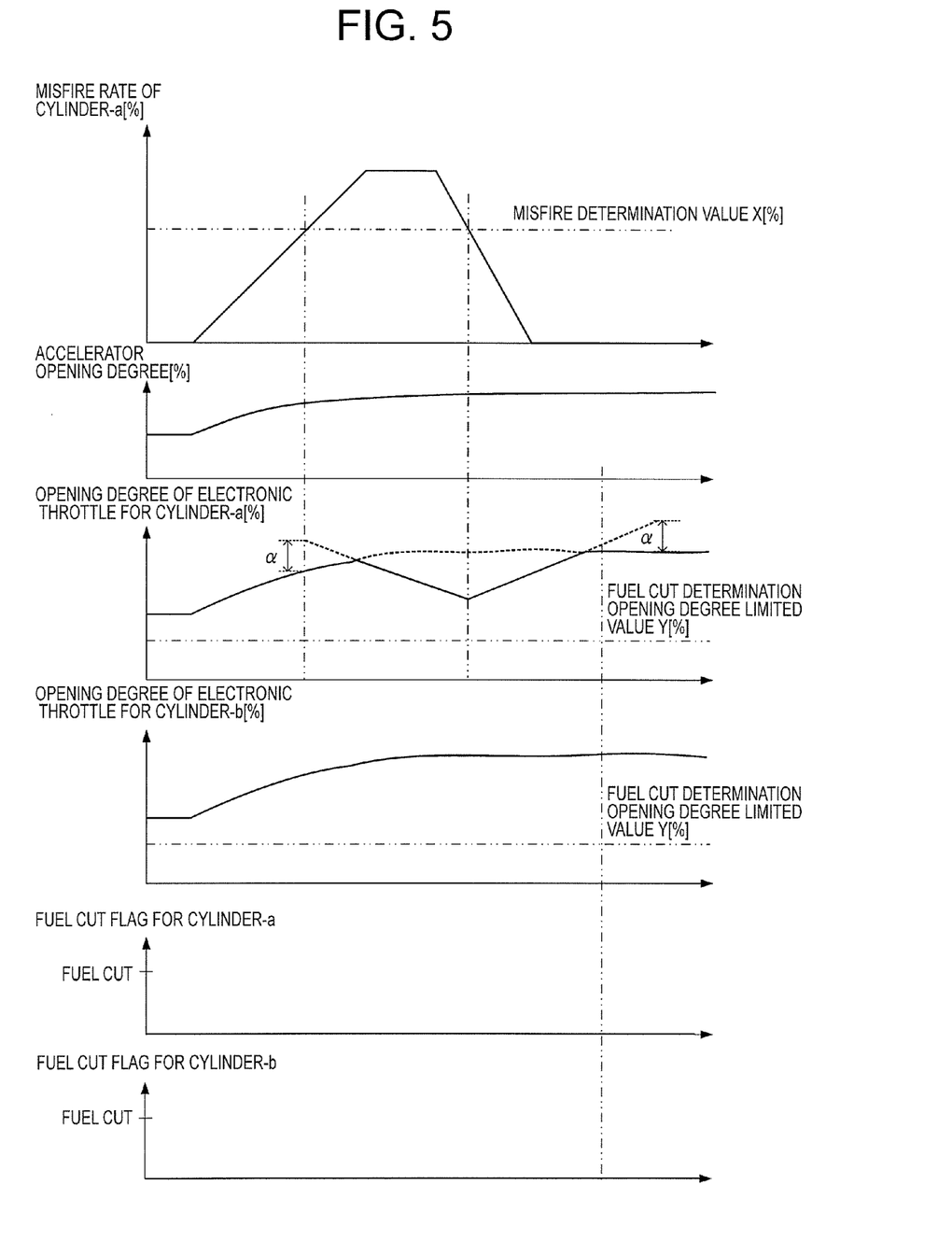
FIG. 5 is a timing chart showing the limitation on the throttle opening degree of the electronic throttle and a recovery from the limitation in the control device for an internal combustion engine according to the first embodiment of the present invention.

Now, referring to flowcharts of FIGS. 2 and 3 and timing charts of FIGS. 4 and 5, a description is given of an operation of the control device for an internal combustion engine according to the first embodiment of the present invention. In the following, a description is given of a case where a misfire occurs only in the cylinder-a 6. Note that, the flowcharts of FIGS. 2 and 3 are repeated at arbitrarily set cycles.

FIG. 2 is a flowchart illustrating processing of detecting a misfire rate in the control device for an internal combustion engine according to the first embodiment of the present invention, and FIG. 3 is a flowchart illustrating processing for the limitation on the throttle opening degree of the electronic throttle and the fuel cut in the control device for an internal combustion engine according to the first embodiment of the present invention.

Moreover, FIG. 4 is a timing chart showing the limitation on the throttle opening degree of the electronic throttle and the fuel cut in the control device for an internal combustion engine according to the first embodiment of the present invention, and FIG. 5 is a timing chart showing the limitation on the throttle opening degree of the electronic throttle and a recovery from the limitation in the control device for an internal combustion engine according to the first embodiment of the present invention.

In FIG. 2, first, when a misfire occurs in the engine, the misfire detection unit detects the misfire state of the cylinder-a 6, and additionally calculates the misfire rate (Step S1).

Then, it is determined whether or not the misfire rate in the cylinder-a 6 exceeds a certain value X[%] set in advance (Step S2).

When it is determined in Step S2 that the misfire rate in the cylinder-a 6 exceeds the certain value X[%] set in advance (namely, YES), a misfire detection flag for the cylinder-a 6 is set (Step S3), and the processing of FIG. 2 is finished.

On the other hand, when it is determined in Step S2 that the misfire rate in the cylinder-a 6 is equal to or smaller than the certain value X[%] set in advance (namely, NO), the misfire detection flag for the cylinder-a 6 is cleared (Step S4), and the processing of FIG. 2 is finished.

In FIG. 3, first, it is determined whether or not a cylinder-a misfire fail flag representing that the fuel cut is being carried out in the cylinder-a 6 is not set (Step S11).

In Step S11, when it is determined that the cylinder-a misfire fail flag is set (namely, YES), the processing of FIG. 3 is finished directly.

On the other hand, in Step S11, when it is determined that the cylinder-a misfire fail flag is not set (namely, NO), it is determined whether or not the misfire detection flag for the cylinder-a 6 is set (Step S12).

In Step S12, when it is determined that the misfire detection flag for the cylinder-a 6 is set (namely, YES), the throttle opening degree control unit gradually decreases the limited value of the throttle opening degree of the electronic throttle for cylinder-a 8 as the time elapses (Step S13).

Specifically, the limited value of the throttle opening degree of the electronic throttle for cylinder-a 8 is decreased from an initial value by a constant opening degree each time. Regarding the method of decreasing the limited value, the decrease rate may be changed for each cycle or depending on the engine rpm. Moreover, the initial value is set to "a current throttle opening degree of the electronic throttle for cylinder-a 8+α[%]", and α is set to a value for mitigating a shock on the vehicle depending on properties of the engine.

On this occasion, the gradual decrease of the limited value of the throttle opening degree of the electronic throttle for cylinder-a 8 from the initial value prevents the electronic throttle for cylinder-a 8 from opening to an opening degree equal to or larger than the limited value of the throttle opening degree even if a rider wants to open the accelerator for acceleration. In contrast, the throttle opening degree of the electronic throttle for cylinder-b 9 can be opened in response to a request of the rider.

Then, it is determined whether or not the fuel cut determination opening degree limited value for cylinder-a is smaller than Y[%] set in advance (Step S14).

In Step S14, when it is determined that the fuel cut determination opening degree limited value for cylinder-a is equal to or larger than Y[%] (namely, NO), the processing of FIG. 3 is directly finished.

On the other hand, in Step S14, when it is determined that the fuel cut determination opening degree limited value for cylinder-a is smaller than Y[%] (namely, YES), the fuel cut is carried out by the fuel injection control unit for the cylinder-a 6 in which the misfire state is detected (Step S15), the cylinder-a misfire fail flag is set (Step S16), and the processing of FIG. 3 is finished. Note that, the cylinder-a misfire fail flag is cleared when the engine stops, but is not cleared until the engine stops.

Moreover, on the other hand, in Step S12, when it is determined that the misfire detection flag for the cylinder-a 6 is not set (namely, NO), the throttle opening degree control unit gradually increases the limited value of the throttle opening degree of the electronic throttle for cylinder-a 8 to the initial value as the time elapses (Step S17), and the processing of FIG. 3 is finished.

On this occasion, FIG. 4 shows a timing chart corresponding to processing for a case where the determination in Step S12 is made as "YES" and the processing proceeds to Steps S13 to S16. In FIG. 4, when the misfire rate of the cylinder-a 6 exceeds X[%], the limited value of the throttle opening degree of the electronic throttle for cylinder-a 8 is decreased by the constant opening degree each time from the initial value (current throttle opening degree+α).

Then, when the limited value of the throttle opening degree of the electronic throttle for cylinder-a 8 becomes smaller than the fuel cut determination opening degree limited value Y[%], the fuel cut for the cylinder-a 6 is carried out, and the decrease of the limited value of the throttle opening degree and the fuel cut are continued until the engine stops.

Moreover, FIG. 5 shows a timing chart corresponding to processing for a case where the determination in Step S12 is made as "NO" and the processing proceeds to Step S17. In FIG. 5, when the misfire rate of the cylinder-a 6 exceeds X[%], the limited value of the throttle opening degree of the electronic throttle for cylinder-a 8 is decreased by the constant opening degree each time from the initial value (current throttle opening degree+α).

Then, when the misfire rate of the cylinder-a 6 becomes equal to or smaller than X[%] before the limited value of the throttle opening degree of the electronic throttle for cylinder-a 8 is decreased to the fuel cut determination opening limited value Y[%], the limited value of the throttle opening degree of the electronic throttle for cylinder-a 8 is gradually increased as the time elapses so as to converge to "the current throttle opening degree of the electronic throttle for cylinder-a 8+α[%]". Regarding the method of increasing the limited value, the limited value may be increased by a constant opening degree each time, or an increase rate may be changed for each cycle or depending on the engine rpm.

As described above, according to the first embodiment, when the misfire detection unit detects the misfire state in any one of the plurality of cylinders, the throttle opening degree control unit decreases a limited value of the throttle opening degree of the misfire cylinder as the time elapses.

As described above, by gradually decreasing the limited value of the throttle opening degree in the cylinder in which the misfire state is detected, the abrupt change in torque can be suppressed and the shock on the vehicle can be mitigated.

Therefore, the catalyst can be appropriately protected, and the drivability can be prevented from degrading when the misfire state is detected.

Moreover, an escape travel may be carried out by using the cylinder determined to be normal.

Moreover, after the throttle opening degree is decreased to the predetermined value for the cylinder in which the misfire state is detected, the fuel injection control unit carries out fuel cut for the cylinder.

Therefore, the catalyst can be more appropriately protected, and the drivability can be more effectively prevented from degrading.

Moreover, the throttle opening degree control unit and the fuel injection control unit continue to decrease the limited value of the throttle opening degree and carry out the fuel cut until the internal combustion engine stops.

Therefore, the catalyst can be protected and the drivability can be prevented from degrading more reliably.

Moreover, when the misfire detection unit no longer detects the misfire state in the period from the start of the decrease of the limited value of the throttle opening degree for the cylinder in which the misfire state is detected until the fuel cut is carried out by the fuel injection control unit, the throttle opening degree control unit increases the limited value of the throttle opening degree as the time elapses.

Therefore, the control is returned to the normal control upon the recovery from the misfire state, and thus the drivability can be improved while the catalyst is appropriately protected.

Though a description is given of the case where the misfire occurs in the cylinder-a 6 in the first embodiment, the present invention is not limited to this case, and the same processing can be applied to a case where the misfire occurs in the cylinder-b 7.

Moreover, though a description is given of the V-twin engine as an example in the first embodiment, the present invention is not limited to this case and can be applied to any engine including at least two cylinders and electronic throttles which can be independently controlled in the respective cylinders.

Moreover, from such a viewpoint as to prevent an abrupt change in torque from occurring when the misfire state is detected, even in an internal combustion engine where the electronic throttles for a plurality of cylinders are connected to each other by means of a link mechanism or the like, the limited value of the throttle opening degree of the electronic throttle can be decreased so that the fuel is cut for a cylinder in which the misfire state occurs at a certain limited value.

What is claimed is:

1. A control device for an internal combustion engine including a plurality of cylinders, the control device comprising:
    a misfire detection unit for detecting a misfire state for each of the plurality of cylinders;
    a plurality of electronic throttles each provided on an intake pipe corresponding to each of the plurality of cylinders, for adjusting an intake air amount taken into each of the plurality of cylinders by way of a throttle opening degree; and
    a throttle opening degree control unit for controlling the throttle opening degree of each of the plurality of electronic throttles,
    wherein, when the misfire detection unit detects the misfire state in any one of the plurality of cylinders, the throttle opening degree control unit gradually decreases a maximum allowed value of the throttle opening degree of the electronic throttle corresponding to the cylinder in the misfire state as time elapses.

2. The control device for the internal combustion engine according to claim 1, further comprising:
    a plurality of injectors each provided on one of each of the plurality of cylinders and the intake pipe corresponding to the each of the plurality of cylinders, for injecting a fuel into the one of each of the plurality of cylinders and the intake pipe; and
    a fuel injection control unit for controlling a fuel injection amount for each of the plurality of injectors,
    wherein, after the throttle opening degree is decreased to a predetermined value for the cylinder in which the misfire state is detected, the fuel injection control unit carries out fuel cut for the cylinder in the misfire state.

3. The control device for the internal combustion engine according to claim 2, wherein the throttle opening degree control unit and the fuel injection control unit continue to decrease the maximum allowed value of the throttle opening degree and carry out the fuel cut until the internal combustion engine stops.

4. The control device for the internal combustion engine according to claim 2, wherein, when the misfire detection unit no longer detects the misfire state in a period from a start of the decrease of the maximum allowed value of the throttle opening degree for the cylinder in which the misfire state is detected until the fuel cut is carried out by the fuel injection control unit, the throttle opening degree control unit increases the maximum allowed value of the throttle opening degree as time elapses.

5. A control method for an internal combustion engine, the internal combustion engine comprising: a plurality of cylinders; a misfire detection unit; and a plurality of electronic throttles each provided on an intake pipe corresponding to each of the plurality of cylinders, for adjusting an intake air amount taken into each of the plurality of cylinders by way of a throttle opening degree, the control method comprising:
    detecting, using the misfire detection unit, a misfire state for each of the plurality of cylinders; and
    gradually decreasing, when the misfire detection unit detects the misfire state in any one of the plurality of cylinders, a maximum allowed value of the throttle opening degree of the electronic throttle corresponding to the cylinder in the misfire state as time elapses.

6. The control method for the internal combustion engine according to claim 5, wherein:
    the internal combustion engine further comprises a plurality of injectors each provided on one of each of the plurality of cylinders and the intake pipe corresponding to the each of the plurality of cylinders, for injecting a fuel into the one of each of the plurality of cylinders and the intake pipe; and
    the control method further comprises carrying out, after the throttle opening degree is decreased to a predetermined value for the cylinder in which the misfire state is detected, fuel cut for the cylinder in the misfire state.

7. The control device for the internal combustion engine according to claim 1, wherein the throttle opening degree control unit gradually decreases the maximum allowed value of the throttle opening degree at a constant rate.

8. The control method for the internal combustion engine according to claim 5, wherein the gradually decreasing the maximum allowed value of the throttle opening degree comprises gradually decreasing the maximum allowed value of the throttle opening degree at a constant rate.

\* \* \* \* \*